Nov. 27, 1951 H. WOOD 2,576,495

WAVE-SIGNAL RESPONDER SYSTEM

Filed July 22, 1947

INVENTOR.
HUBERT WOOD

BY John P. Harvey
ATTORNEY

Patented Nov. 27, 1951 2,576,495

UNITED STATES PATENT OFFICE 2,576,495

WAVE-SIGNAL RESPONDER SYSTEM

Hubert Wood, Hollinwood, England, assignor to Ferranti Limited, Hollinwood, England, a corporation of Great Britain Application July 22, 1947, Serial No. 762,732
In Great Britain November 5, 1945

Section 1, Public Law 690, August 8, 1946
Patent expires November 5, 1965

5 Claims. (Cl. 250—15)

Figure 1:
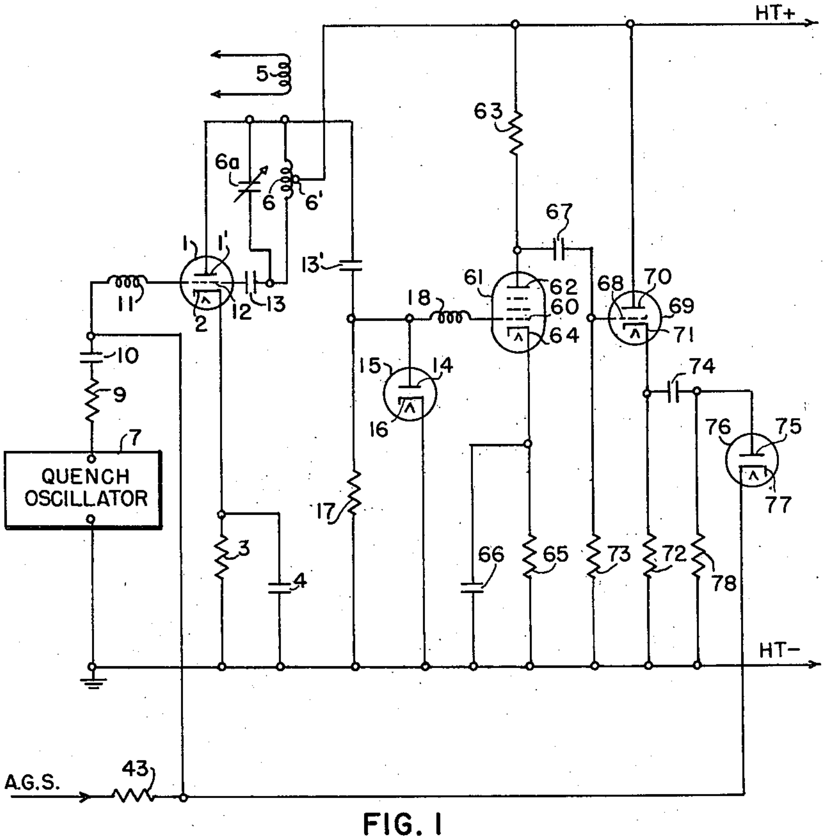

This invention relates to radio receivers operating on the superregenerative principle and having means for maintaining the sensitivity condition thereof at a constant or nearly constant level, in spite of alteration of a characteristic of such receiver, for instance, of its tuning frequency, its supply voltage or its aerial loading.

A particular application of such superregenerative receivers is for use in association with transmitting means to form what are usually known as "responders" for the purpose of receiving signal pulses from a remote transmitting station, modifying the wave form of such signal pulses in a manner determined by the nature or identity of the object in which the receiver is embodied, and then transmitting the modified signal pulses thereby providing an indication of the nature or identity of such object to a remote station adapted to receive the modified signal pulses. Although various forms of such a radio receiver or responder have been employed, this invention is particularly concerned with the type in which the same valve is utilized both for superregeneratively receiving the signal pulses and for transmitting the modified signal pulses.

An operational disadvantage of such a receiver or responder having a common valve for superregenerative reception of the incoming interrogating signal pulses and for subsequent transmission of response signal pulses thereto lies in its tendency towards instability, since spurious voltages arising in the receiving stage itself may cause unwanted transmissions. These unwanted transmissions when received at a distant station are confusing and they decrease the capacity of the system to handle wanted signals.

The main object of the invention is to provide improved arrangements by which the transmission of such spurious signals may be prevented.

According to the present invention a wave-signal responder comprises a superregenerative circuit for receiving pulse-modulated interrogating wave signals and for deriving the pulse-modulation components thereof to provide a control signal of pulse wave form, the superregenerative circuit having a control circuit which when energized is effective to cause the superregenerative circuit to operate as a transmitter of wave signals. The responder includes a control-signal translating channel including a diode valve having an anode and a cathode for translating to the control circuit for energization thereof only that portion of each pulse of the control signal which has an amplitude exceeding a predetermined critical value; and means for applying a bias potential to the cathode of said diode to bias said cathode to a more positive potential than its anode except during the application thereto of a signal the amplitude of which is greater than said predetermined value, thereby to cause the superregenerative circuit operating as a transmitter to transmit a pulse-modulated reply wave signal.

For a better understanding of the present invention, together with other and further objects thereof, reference is had to the following description taken in connection with the accompanying drawing, and its scope will be pointed out in the appended claims. In the drawing, Fig. 1 is a circuit diagram representing the arrangement of a responder which embodies the present invention in a particular form, and Fig. 2 is a circuit diagram representing a portion of a complete responder embodying a modified form of the invention.

Figure 2:
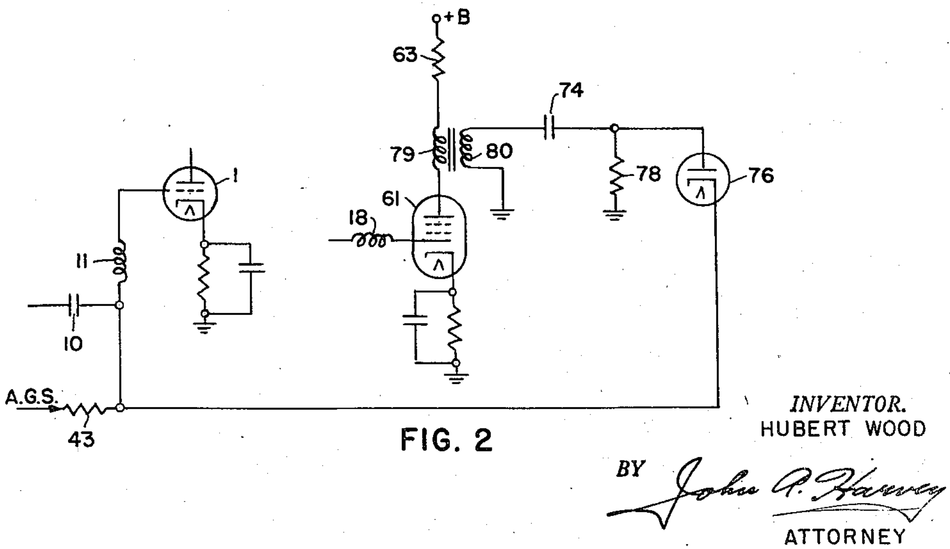

Referring now more particularly to Fig. 1 of the drawing, a superregenerative receiving valve 1 is arranged as a Hartley-type oscillator with a tuned circuit, constituted by an inductance 6 and parallel variable condenser 6a, connected between its anode 1′ and its control grid 12 by way of condenser 13, the mid-point 6′ of the inductance 6 being connected to the positive terminal of an H. T. supply whose negative terminal is earthed.

The tuning inductance coil 6 is mutually coupled with an aerial coil 5 connected to an aerial not shown. The variable condenser 6a is arranged to sweep cyclically through a range of capacity values. The cathode 2 of valve 1 is connected to earth by way of an auto-biasing arrangement formed by a resistance 3 and a condenser 4. The requisite quenching oscillations are supplied by a quench-frequency oscillator 7 and are fed into the control-grid cathode circuit of the valve 1 by way of resistance 9, condenser 10 and choke coil 11 while the controlling potential from an automatic-gain-stabilizing system is also fed to the control grid 12 by way of resistance 43 and the radio-frequency choke 11.

Anode 1′ of valve 1 is also joined by way of a condenser 13′ to the anode 14 of a diode rectifier valve 15 whose cathode 16 is earthed. A load resistance 17 is connected across this diode valve. Anode 14 is joined by way of a high-frequency choke 18 to the control grid 60 of a pentode amplifier valve 61, the suppressor and screen grids of which are connected in the normal manner for an amplifier valve. Anode 62 of this valve 61 is joined by way of a load resistance 63 to the positive terminal of the high-tension supply while the cathode 64 thereof is connected to earth by way of an auto-biasing network 65, 66.

A further connection is made from anode 62 by way of a condenser 67 to the control grid 68 of a cathode-follower valve 69, the anode 70 of which is joined directly to the positive terminal of the high-tension supply and the cathode 71 of which is connected by a cathode-load resistance 72 to the earthed negative terminal of the high-tension supply. Control grid 68 is connected to earth by way of a grid-leak resistance 73.

Cathode 71 is joined by way of condenser 74 to the anode 75 of a diode valve 76, the cathode 77 of which is connected to the junction between the condenser 10 and the high-frequency choke 11 so as to provide a potential source for the control grid 12 of the triode receiving valve in parallel with that of the auto-gain-stabilizing potential fed through resistance 43. Anode 75 of diode 76 is connected to earth by way of resistance 78 while condenser 74 and resistance 78 form a pulse-width controlling circuit.

In operation, when an interrogating signal pulse is received from a remote station, it is amplified superregeneratively by valve 1 (which is maintained in a condition of constant sensitivity by the auto-gain-stabilizing circuit which is joined by way of resistance 43 and choke 11 to its control grid), and then rectified by diode valve 15, the rectified output across load resistance 17 in the form of a negative-polarity signal pulse is amplified by pentode valve 61 and the resultant positive-polarity signal pulse at its anode is fed to the control grid 68 of cathode-follower valve 69. The similar positive-polarity pulse output appearing across cathode load resistance 72 is then fed to the control grid 12 of receiving and transmitting valve 1 by way of the pulse-width control circuit of condenser 74 and resistance 78, diode valve 76 and choke 11. The potential of cathode 2 and the standing potential, with respect to earth of control grid 12 (which is determined by the auto-gain-stabilizing circuit) are chosen so that the potential of cathode 77 of diode valve 76 is normally more positive than its anode 75 by an amount greater than the mean voltage amplitude of amplified spurious signals but not as great as the voltage amplitude of an amplified signal pulse received from a remote transmitting station.

It will be seen that only those signal pulses received from a remote transmitting station which have a voltage amplitude sufficient to make the potential of anode 75 greater than the potential of cathode 77, are fed to the control grid 12 of the combined receiving and transmitting valve 1 to cause retransmission.

In this way, spurious signals arising in the receiving stage are not applied to the control grid of the receiving and transmitting valve by way of the pulse-width controlling circuit and thus are prevented from causing unwanted transmissions.

Furthermore, during periods of reception the required quench-frequency voltage is applied to the control grid of the receiving valve without considerable power expenditure since the cathode-follower stage, which has a small output impedance normally in shunt to such quench-oscillation source, is isolated from the control grid 12.

In the Fig. 2 modification of the invention, valve 61 has a transformer primary winding 79 included in its anode circuit, the output from the transformer secondary winding 80 being fed direct to the pulse-width controlling circuit of condenser 74 and resistance 78 instead of to the cathode-follower valve 69 which is, in this instance, dispensed with.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A wave-signal responder comprising: a superregenerative circuit for receiving pulse-modulated interrogating wave signals and for deriving the pulse-modulation components thereof to provide a control signal of pulse wave form; said superregenerative circuit having a control circuit which when energized is effective to cause said superregenerative circuit to operate as a transmitter of wave signals; a control signal-translating channel including a diode valve having an anode and a cathode for translating to said control circuit for energization thereof only that portion of each pulse of said control signal which has an amplitude exceeding a predetermined critical value; and means for applying a bias potential to the cathode of said diode to bias said cathode to a more positive potential than its anode except during the application thereto of a signal the amplitude of which is greater than said predetermined value, thereby to cause said superregenerative circuit operating as a transmitter to transmit a pulse-modulated reply wave signal.

2. A wave-signal responder comprising: a superregenerative circuit including a regenerator valve having a gain-control electrode for receiving pulse-modulated interrogating wave signals and a rectifier for deriving the pulse-modulation components thereof to provide a control signal of pulse wave form; said superregenerative circuit having a control circuit coupled to a gain-control electrode of said regenerator valve which when energized is effective to cause said superregenerative circuit to operate as a transmitter of wave signals; a control signal-translating channel including a cathode-follower valve having input electrodes including a cathode stage having its input electrodes coupled to said rectifier; and a diode valve serially included in said control circuit between the cathode of said cathode-follower valve and said gain-control electrode of said regenerator valve for translating to said control circuit for energization thereof only that portion of each pulse of said control signal which has an amplitude exceeding a predetermined critical value, thereby to cause said superregenerative circuit operating as a transmitter to transmit a pulse-modulated reply wave signal.

3. A wave-signal responder comprising: a superregenerative circuit including a regenerator valve having a gain-control electrode for receiving pulse-modulated interrogating wave signals and a rectifier for deriving the pulse-modulation components thereof to provide a control signal of pulse wave form; said superregenerative circuit having a control circuit including a diode valve having one electrode coupled to a gain-control electrode of said regenerator valve which when energized is effective to cause said superregenerative circuit to operate as a transmitter of wave signals; and a control signal-translating channel including a thermionic amplifier valve having input electrodes coupled to said rectifier and having an output circuit and a transformer having a primary winding connected in series with said output circuit of said thermionic valve and a secondary winding connected to the other electrode of said diode valve for translating to said control circuit for energization thereof only that portion of each pulse of said control signal which has an amplitude exceeding a predetermined critical value; thereby to cause said superregenerative circuit operating as a transmitter to transmit a pulse-modulated reply wave signal.

4. A wave-signal responder comprising: a superregenerative circuit including a regenerator valve for receiving pulse-modulated interrogating wave signals and a rectifier for deriving the pulse-modulation components thereof to provide a control signal of pulse wave form; said superregenerative circuit having a control circuit including a diode valve having one electrode coupled to the control grid of said regenerator valve which when energized is effective to cause said superregenerative circuit to operate as a transmitter of wave signals; and a control signal-translating channel including a thermionic amplifier valve having input electrodes coupled to said rectifier and having an output circuit and a transformer having a primary winding connected in series with the output circuit of said thermionic valve and a secondary winding connected to the other electrode of said diode valve for translating to said control circuit for energization thereof only that portion of each pulse of said control signal which has an amplitude exceeding a predetermined critical value, thereby to cause said superregenerative circuit operating as a transmitter to transmit a pulse-modulated reply wave signal.

5. A wave-signal responder comprising: a superregenerative circuit including a regenerator valve for receiving pulse-modulated interrogating wave signals and a rectifier for deriving the pulse-modulation components thereof to provide a control signal of pulse wave form; said superregenerative circuit having a control circuit including a diode valve having one electrode coupled to the control grid of said regenerator valve which when energized is effective to cause said superregenerative circuit to operate as a transmitter of wave signals; means for maintaining the sensitivity of said superregenerative circuit at a substantially constant value by the application of a sensitivity-control potential to said control grid in parallel with the potential applied thereto from said control circuit; and a control signal-translating channel including a thermionic amplifier valve having input electrodes coupled to said rectifier and having an output circuit and a transformer having a primary winding connected in series with the output circuit of said thermionic valve and a secondary winding connected to the other electrode of said diode valve for translating to said control circuit for energization thereof only that portion of each pulse of said control signal which has an amplitude exceeding a predetermined critical value, thereby to cause said superregenerative circuit operating as a trnasmitter to transmit a pulse-modulated reply wave signal.

HUBERT WOOD.

REFERENCES CITED

The following references are of record in the file of this patent:

UNITED STATES PATENTS

| Number | Name | Date |
|---|---|---|
| 2,415,667 | Wheeler | Feb. 11, 1947 |
| 2,419,571 | Labin | Apr. 29, 1947 |
| 2,429,513 | Hansen et al. | Oct. 21, 1947 |
| 2,460,202 | Tyson | Jan. 25, 1949 |